United States Patent Office.

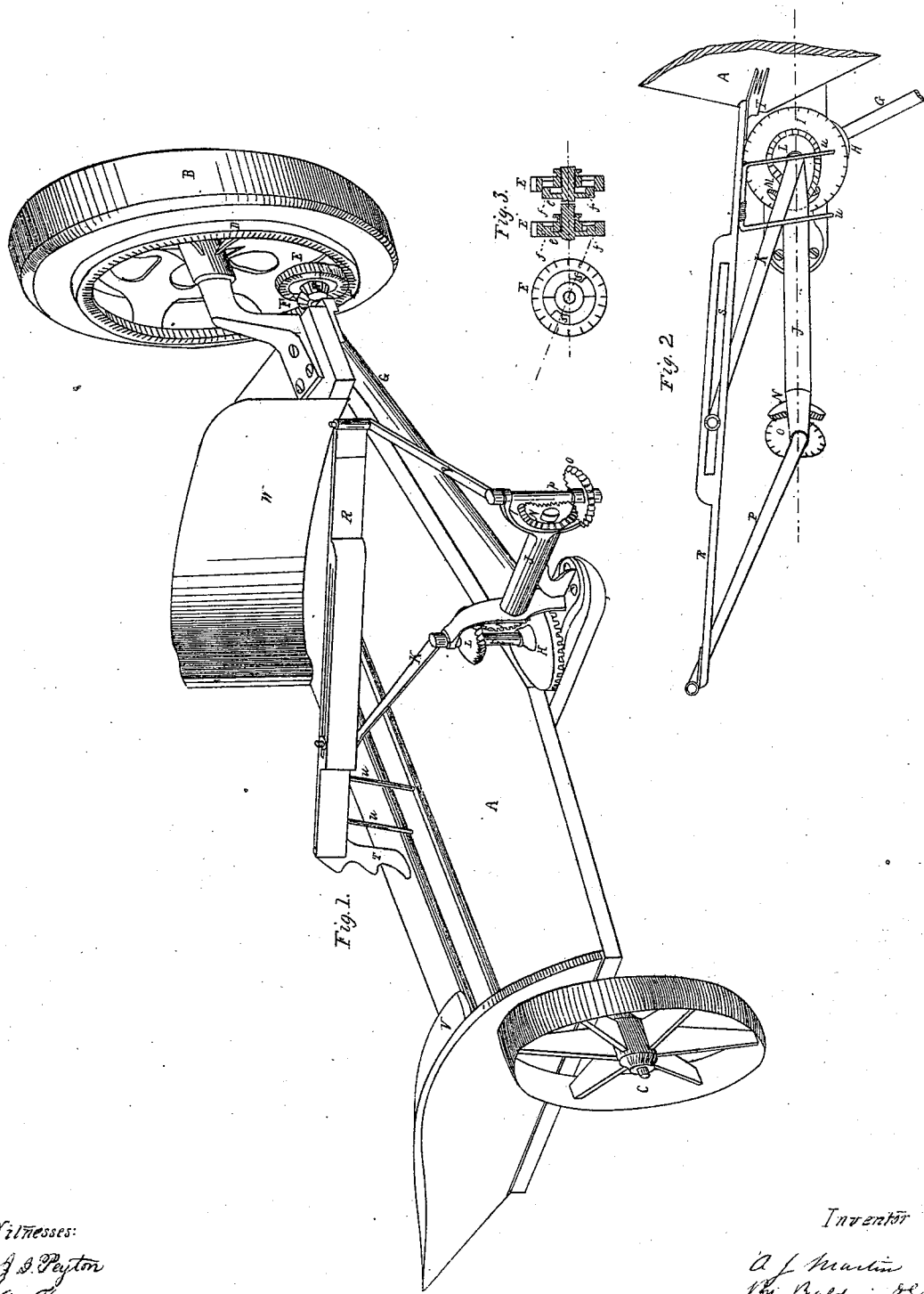

ANDREW J. MARTIN, OF ROCKFORD, ILLINOIS.

*Letters Patent No. 64,345, dated April 30, 1867.*

IMPROVEMENT IN HARVESTER RAKES.

*The Schedule referred to in these Letters Patent and making part of the same.*

TO ALL WHOM IT MAY CONCERN:

Be it known that I, ANDREW J. MARTIN, of Rockford, in the county of Winnebago, and State of Illinois, have invented a new and useful Improvement in Automatic Rakes for Harvesting Machines, of which the following is a full, clear, and exact description, reference being had to the accompanying drawings, which make part of this specification, and in which—

Figure 1 represents a view in perspective of a harvester embracing my improvements.

Figure 2 represents a plan or top view of the rake and gearing detached; and

Figure 3, a view of the main spur-pinion which drives the rake.

The improvement herein claimed consists, first, in driving an automatic rake by a series of concave elliptic bevel-gears, whereby I am enabled to impart positively different rates of speed to the rake during different positions of its circuit without jerking the gearing; second, in combining a rake-arm, moving horizontally over the platform of a harvester, with two crank-arms, mounted one behind the other, and driven by elliptic bevel-gears; third, in a novel device for connecting and disconnecting the rake-gear; fourth, in combining a rigid rake-head with yielding teeth, as hereinafter shown.

In the accompanying drawings, a platform, A, is shown as mounted upon two wheels B C. An internally geared spur-wheel, D, drives a corresponding pinion, F, turning loosely on a short still shaft. The spur-pinion E has a concavity on its inner face, in which a boss, e, on the pinion F', fits. The pinion E slides endwise on its shaft, and when pushed in so as to enclose the boss, the two pinions E F' are locked and turned together by pins, f, on the face of the boss, which interlock with the arm of pinion E. Pinion F' drives a corresponding inverted bevel-pinion, F, on a shaft, G, mounted in suitable bearings, and arranged so as to extend horizontally backward, but at an acute angle to the finger-beam. A small bevel-pinion, H, on this shaft, drives a crown-wheel, I, on a vertical shaft, i, mounted in one end of a bracket, J, and carrying the front crank-arm K on its upper end. The bracket J is shown in this instance as consisting of a tubular stem, and with forked ends to carry the bearings of the crank-arms. A concave elliptic bevel-gear, L, on the shaft i, drives a corresponding one, M, on horizontal shaft enclosed in the bracket J, and carrying on its rear end a similar elliptic gear, N, which drives a similar one, O, on the rear crank-shaft p, which carries a crank-arm, P, to which the rear end of the rake-arm R is pivoted. The rake-arm has a longitudinal vertical slot, S, near its middle, in which the head of the crank-arm K may slide, in order to give the requisite traverse to the rake-teeth. The rake is provided with a rigid head, T, and also with teeth u, which are so pivoted as to be held rigidly when the rake is sweeping the grain from the platform, but yield when the rake is passing from the gearing to the divider-side of the machine. A spring of any suitable construction keeps the teeth down when not held up positively.

The operation of the rake is as follows: We will suppose the rake to start from the position shown in fig. 2, where the flexible teeth are shown as raised to pass over the crank-arm K. The rake passes to the divider-side of the platform, passing under a ledge, V, to avoid becoming entangled with the falling grain. It then advances along the side of the divider to the front of the platform, across which it sweeps parallel to the finger-beam, sweeping the fallen grain against the inclined grain-board W, and compressing it into a compact gavel, out of the way of the falling grain. It then draws it back endwise, and deposits it upon the ground inside the driving-wheel, and out of the path of the team in cutting the next swath. The rake then sweeps across behind the platform to the starting-point. It will be seen that my elliptic gears form parts of spheres, and that consequently, by varying the relative arrangement of the gears, I can impart a positive varying velocity to the rake during different parts of its circuit without jerking the gearing.

What I claim as my invention, and desire to secure by Letters Patent of the United States, is—

1. Driving an automatic rake by a series of concave elliptic bevel-gears, substantially in the manner and for the purpose described.

2. The combination of a slotted rake-arm moving horizontally over the platform, with two crank-arms, arranged one behind the other, and driven by elliptic gearing, substantially in the manner and for the purpose described.

3. The combination of the recessed pinion E, with the boss e, when arranged and operating as described, to throw the rake into and out of gear.

4. The combination of the rigid rake-head T, with the yielding teeth, when arranged and operating as described.

In testimony whereof I have hereunto subscribed my name.

ANDREW J. MARTIN.

Witnesses:
SILAS G. TYLER,
S. RISING.